United States Patent [19]
Kim et al.

[11] Patent Number: 5,917,782
[45] Date of Patent: Jun. 29, 1999

[54] METHOD OF REPRODUCING HIGH-SPEED AUDIO DATA BY A CD-ROM PLAYER

[75] Inventors: Sung Han Kim; Yong Jun Kim, both of Seoul, Rep. of Korea

[73] Assignee: LG Electronics Inc., Seoul, Rep. of Korea

[21] Appl. No.: 08/992,915

[22] Filed: Dec. 18, 1997

[30] Foreign Application Priority Data

Dec. 18, 1996 [KR] Rep. of Korea ................... 1996-67261

[51] Int. Cl.[6] .................................................. G11B 17/22
[52] U.S. Cl. ............................................... 369/32; 369/47
[58] Field of Search .................................. 369/32, 47, 59, 369/33, 18, 48, 60, 50, 53–57, 44.14, 44.28; 360/32, 24, 27

[56] References Cited

U.S. PATENT DOCUMENTS

| | | | |
|---|---|---|---|
| 5,220,551 | 6/1993 | Tateishi et al. | 369/50 |
| 5,222,054 | 6/1993 | Mauraoka et al. | 369/32 |
| 5,420,839 | 5/1995 | Tateishi | 369/32 |

Primary Examiner—Ali Neyzari

[57] ABSTRACT

A high-speed audio data reproducing method in a CD-ROM player which is suitable for reproducing a high-speed audio data without a reduction in the rotation speed of disc by the CD-ROM player. The method is provided with reading data at a high speed from the disc, performing an audio data error correction for the data to decode the corrected data primarily, determining whether or not the primarily decoded data is audio data, if the primarily decoded data is audio data, selecting the primarily decoded data to temporarily store it into a buffer, reading the temporarily stored audio data at the normal speed and transmitting it, converting the transmitted audio data into an analog signal to make a voice output of it, and if an overflow occurs in the step of temporarily storing the audio data, then controlling a track jump to read in the previously read data again, stopping the track jump control and the temporal store of input data upon occurrence of the overflow, and restarting the temporal store of input data when the data track-jumped and inputted again arrives at the temporarily stopped point. The method further includes the steps of if the data read at the high speed is not audio data, then performing an audio data error correction for the primarily decoded data to decode the corrected data secondarily, selecting the secondarily decoded digital data to store it temporarily, and transmitting the temporarily stored digital data to a host computer at a high speed.

10 Claims, 3 Drawing Sheets

METHOD OF REPRODUCING HIGH-SPEED AUDIO DATA BY A CD-ROM PLAYER

BACKGROUND OF THE INVENTION

1. Field of the Invention

This invention relates to a method of reproducing high-speed audio data by a CD-ROM player which is capable of reproduce both audio and digital data.

2. Description of the Prior Art

Hitherto, there has been proposed a compact disc-read only memory(CD-ROM) and a compact disc-interactive (CD-I) as an optical disc capable of recording both digital data such as the data operable in computers, and video data as well as audio data, such as music, voice sound and so on. The CD-ROM is a disc standardized for recording above-mentioned digital data as well as audio data in the audio signal area, yet having compatibility with a compact disc (CD) which basically interactive disc deals with acoustic signals only. On the other hand, the CD-I is an interactive disc defined in the Mode-2 of the CD-ROM, and is a standardized system in which the above-mentioned digital data, video data, audio data and so on are recorded per blocks by a time division multiplex mode.

By the way, it has been a common procedure nowadays to read in the digital data at a twice or four times faster speed than the normal speed in order to meet with the recent increase in requirement for high-speed data processing. However, since it is necessary to reproduce the audio data as a correct sound in case that digital data and audio data are taken in by turns form a single disc, in the conventional CD-ROM player, the audio data has to be reproduced at the same speed as the sampling frequency thereof. Due to this, it has been a problem to require a certain time to switch a rotation speed of the disc whenever the signal to be received from the disc is changed from audio to digital and vice versa, and therefore there has not been much merit in processing digital data at a high speed.

A simple solution to this problem has been to read in the audio signal at the same speed as that for reading the digital data, but has not been effective since the conventional CD-ROM player can not make a faithful reproduction of the audio signal at a high speed due to a change in the reproduction speed.

A scheme for overcoming such problems as described above has been suggested in U.S. Pat. No. 5,420,839, issued to Kiyoshi Tateishi on May 30, 1995, which disclosed a highspeed audio data reproducing technique for making a faithful reproduction of the audio data at a high speed by utilizing a CD-ROM data storage device used to transmit the CD-ROM data as an input buffer of an audio signal processing section. According to the high-speed audio data reproducing technique disclosed in the above U.S. Patent, the CD-ROM data storage device converts a transfer rate of the audio data read from a disc being rotated at a high speed into a transfer rate corresponding to the sampling frequency thereof, thereby making a faithful reproduction of the audio data without a reduction in the rotation speed of disc.

In the technique disclose in the above U.S. Patent, the connected position of the CD-ROM data storage device must be changed from the start stage into the end stage of a signal process path and vice versa in accordance with a type of data read in the disc. To this end, as shown in FIG. 1, it additionally requires an audio buffer controller 10 and two selectors 9 and 11 arranged among a CD-ROM data storage 7, an audio signal processing section 11 and a CD-ROM data processing section 6. Due to the audio buffer controller 10 and the two selectors 9 and 11 added as described above, the signal process path in the CD-ROM player becomes long and complicated, and hence it becomes difficult to make an integration of the CD-ROM player circuit.

SUMMARY OF THE INVENTION

Accordingly, it is an object of the present invention to provide a method of reproducing high-speed audio data in a CD-ROM player which simplifies a signal process path in the CD-ROM player and is adapted to make a faithful reproduction of the high-speed audio data without any reduction in the rotation speed of disc.

Another object of the present invention is to provide a method of reproducing high-speed audio and digital data in a CD-ROM player which is capable of simplifying a signal process path in the CD-ROM player as well as reproducing the high-speed audio and digital data with any reduction in the rotation speed of disc.

Still another object of the present invention is to provide a CD-ROM player with a simplified circuit configuration which is adapted to alternately reproduce high-speed digital data and audio data without reducing the rotation speed of disc.

In order to achieve these and other objects of the invention, an audio data reproducing method according to one aspect of the present invention includes the steps of reading data at a high speed from the disc, performing an audio data error correction for the data to decode the corrected data primarily, determining whether or not the primarily decoded data is audio data, if the primarily decoded data is audio data, selecting the primarily decoded data to temporarily store it into a buffer, reading the temporarily stored audio data at the normal speed and transmitting it, converting the transmitted audio data into an analog signal to make a voice output of it, and if an overflow occurs in the step of temporarily storing the audio data, then controlling a track jump to read in the previously read data again, stopping the track jump control and the temporal store of input data upon occurrence of the overflow, and restarting the temporal store of input data when the data track-jumped and inputted again arrives at the temporarily stopped point. The method further includes the steps of if the data read at the high speed is not audio data, then performing an audio data error correction for the primarily decoded data to decode the corrected data secondarily, selecting the secondarily decoded digital data to store it temporarily, and transmitting the temporarily stored digital data to a host computer at a high speed.

An audio data reproducing apparatus according to another aspect of the present invention includes means for reading in data at a high speed from the disc, primary decoding means for performing an audio data error correction for the data to decode the corrected data primarily, buffer means for selecting and temporarily storing the primarily decoded data when the primarily decode data is audio data, audio interface means for reading the temporarily stored audio data from the buffer means at the normal speed and transmitting it, means for converting the transmitted audio data into an analog signal to make a voice output of it, track jump control means for performing a track jump if an overflow occurs in the buffer means, buffer control means for controlling writing and reading operations in the buffer means and simultaneously inhibiting the writing operation in the buffer means upon occurrence of the overflow and for informing it, and system control means for controlling to select the primarily decoded data as an input of the buffer means when the input data is audio data and for controlling the track jump control means in accordance with an output of the buffer control means. The apparatus further includes secondary decoding means for performing an audio data error correction for the primarily decoded data to decode the corrected data secondarily if the data read at the high speed is not audio data, and host interface means for transmitting the temporarily stored digital data to a host computer at a high speed.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
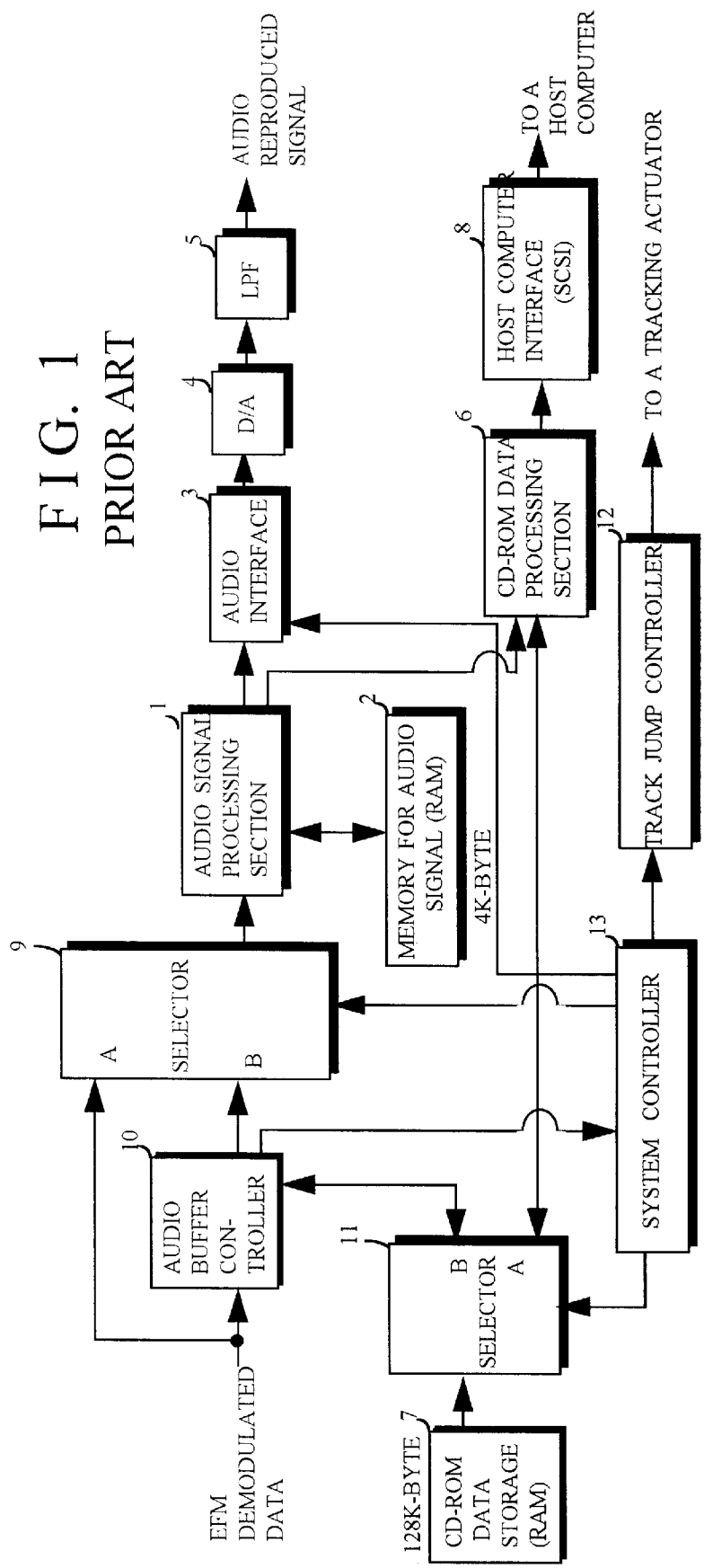
FIG. 1 is a schematic block diagram showing a configuration of a conventional CD-ROM player.
Figure 2:
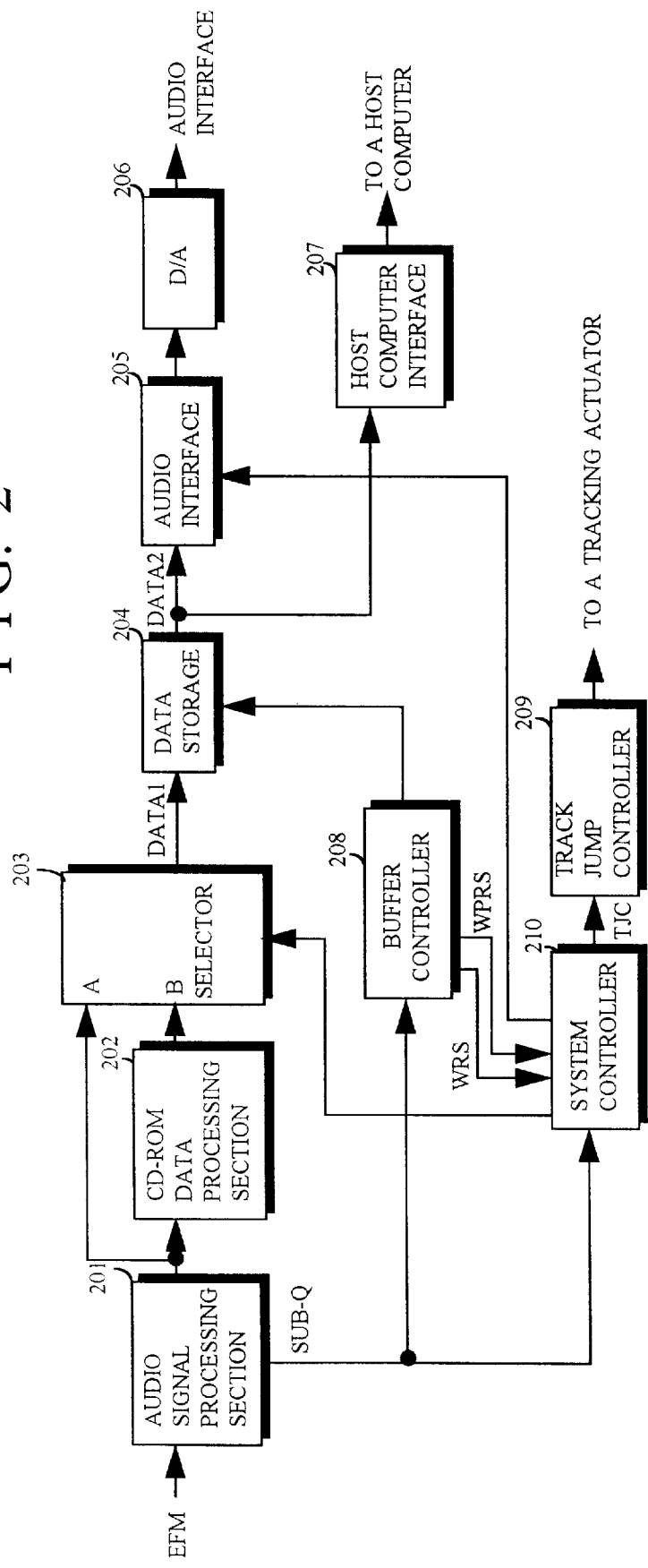
FIG. 2 is a schematic block diagram showing a configuration of a CD-ROM player to which a method according to the present invention is applied.

FIG. 2 is a block diagram showing an embodiment of a CD-ROM player to which a method according to the present invention is applied. As shown in FIG. 2, the CD-ROM player includes an audio signal processing section 201 for receiving data demodulated by the EFM(Eight-to-Fourteen Modulation) method, hereinafter simply referred to "EFM demodulated data", and a CD-ROM data processing section 202 and a first selector 203 that are connected to the audio signal processing section 201 in parallel. The EFM modulated data is produced by demodulating data recorded in the disc by the EFM demodulation method after picking up the same by means of a pickup. In such a EFM demodulated data EFM, there emerge alternately digital data operable in computers and audio data, such as music, voice sound and so on as the disc rotates. The EFM demodulated data EFM is inputted to the audio signal processing section 201 at a different transfer rate in accordance with the rotation speed of disc. In other words, the EFM demodulated data EFM is transferred at the normal rate when the disc is rotated at the normal speed; while it is transferred at a twice or four times faster rate than the normal rate when the disc is rotated at a twice or four times faster speed than the normal speed. Accordingly, audio data and digital data emerging alternately in the EFM demodulated data is supplied to the audio signal processing section 201 at a twice or four times rate faster than the normal transfer rate, that is, the sampling frequency of the audio data when the disc is rotated at twice or four times the normal speed. Also, the processing speed in the audio signal processing section 201 and the CD-ROM data processing section 202 responsive to such an EFM demodulated data EFM is varied in accordance to the rotation speed of disc.

The audio signal processing section 201 separates subcodes SUB-Q from the EFM demodulated data EFM and at the time decodes the EFM demodulated data primarily. In order to separate the sub-codes SUB-Q, the audio signal processing section 201 extracts sub-codes from the EFM demodulated data EFM by utilizing a sub-code synchronous signal and checks whether or not an error is included in the extracted sub-code by the cyclic redundancy check(CRC) method. The audio signal processing section 201 performing an operation as described above includes a synchronous separator for separating the sub-code synchronous signal, a code extractor for extracting the sub-codes, and a CRC circuit for detecting an error, etc. Further, the audio signal processing section 201 checks whether or not an error is included in the EFM demodulated data EFM by the Cross Interleave Reed-Solomon Code(CIRC) error checking method and corrects the checked error, thereby decoding the EFM demodulated data EFM primarily. In the case where the EFM demodulated data is audio data, the audio data is reconstructed by such a decoding operation of the audio signal processing section 201. The primarily decoded EFM demodulated data as described above is commonly supplied to a first input port A of the first selector 203 and the CD-ROM data processing section 202.

The CD-ROM data processing section 202 corrects an error included in the primarily decoded EFM demodulated data by utilizing error correction parity codes P and Q included in the primarily decoded EFM demodulated data, thereby secondarily decoding the primarily decoded EFM demodulated data. Digital data is reconstructed by the primary decoding process in the audio signal processing section 201 and the secondary decoding process in the CD-ROM data processing section 202 as described above. In other words, audio data can be reconstructed by means of the audio signal processing section 201 while digital data can be accurately reconstructed by way of both the audio signal processing section 201 and the CD-ROM data processing section 202. The digital data reconstructed in this way is supplied to a second input port B of the first selector 203. When the EFM demodulated data EFM is audio data, the first selector 203 selects the audio data from the audio signal processing section 201 and supplies the selected audio data to the CD-ROM data storage 204 as a first CD-ROM data DATA1. Otherwise, when the EFM demodulated data EFM is digital data, the first selector 203 selects the digital data from the audio signal processing section 201 and supplies the selected digital data to the CD-ROM data storage 204 as the first CD-ROM data DATA1. This first CD-ROM data DATA1 is transmitted at the same transfer rate as the sampling frequency of the audio signal when the disc is rotated at the normal speed; while it is transmitted at a twice or four times faster transfer rate than the sampling frequency of the audio signal when the disc is rotated at a twice or four times faster speed than the normal speed.

The CD-ROM player further includes an audio interface 205 and a digital to analog converter(D/A) 206 that are connected to a CD-ROM data storage 204 in serial, and a host computer interface 207 for interfacing the CD-ROM data storage 204 with a host computer not shown. The CD-ROM data storage 204 records the first CD-ROM data DATA1 from the first selector 203 at the same rate as the sampling frequency of the audio signal when the disc is rotated at the normal speed; while it records the first CD-ROM data DATA1 at a twice or four times faster rate than the sampling frequency of the audio signal when the disc is rotated at a twice or four times faster speed than the normal speed. Further, the CD-ROM data storage 204 reads the first CD-ROM data DATA1 recorded in itself at a rate corresponding to the sampling frequency of the audio data when the disc is rotated at the normal speed and the audio data is included in the EFM demodulated data EFM; while it reads the first CD-ROM data DATA1 recorded in itself at a twice or four times faster rate than the sampling frequency of the audio data when the disc is rotated at a twice or four times faster speed than the normal speed and digital data is included in the EFM demodulated data EFM. The CD-ROM data storage 204 performing the recording and reading operation as described above reduces a transfer rate of the audio data from twice or four times the sampling frequency of audio signal into the sampling frequency of audio signal when a CD-ROM disc is reproduced at a high speed. As a result, there is outputted from the CD-ROM data storage 204 second CD-ROM data including either audio data maintaining a constant transfer rate(i.e., the sampling frequency of audio signal) irrespective of the rotation speed of disc, or digital data having a variable transfer rate(i.e., the sampling frequency of audio signal, twice or four times the sampling frequency of audio signal) changed in accordance with the rotation speed of disc. When audio data is included in the EFM demodulated data EFM, the audio interface 205 transmits the second CD-ROM data DATA2 inputted at the same rate as the sampling frequency of audio signal from the CD-ROM data storage 204 to the digital to analog(D/A) converter 206 as the audio data. Then, the D/A converter 206 converts the audio data from the audio interface 205 into an analog signal to thereby generate an audio signal. When digital data is included in the EFM demodulated data EFM, the host computer interface 207 supplies the second CD-ROM data DATA2 inputted from the CD-ROM data storage 204 at the same rate as, or at a twice or four times rate of the sampling frequency of audio signal to the host computer as digital data. This host computer interface 207 employs an interface device such as the small computer system interface, hereinafter simply referred to as "SCIS".

Moreover, the CD-ROM player further includes a buffer controller 208 for controlling the writing and reading operation in the CD-ROM data storage 204, a track jump controller 209 for controlling a tracking actuator included in the pickup, and a system controller 210 for controlling the first selector 203, the audio interface 205 and the track jump controller 209. When the disc is rotated at a twice or four times faster speed that the normal speed and audio data is included in the EFM demodulated data EFM, the buffer controller 208 is responsive to sub-codes from the audio signal processing section 201, thereby periodically stopping the writing operation in the CD-ROM data storage 204. Further, the buffer controller 208 generates a write request signal WRS requesting to perform the storing operation in the CD-ROM data storage 204 and a write pause request signal WPRS requesting to temporarily stop the storing operation in the CD-ROM data storage 204. The temporal stop of the writing operation prevents audio data which have not been read yet because the writing operation is carried out twice or four times faster than the reading operation from being updated by new audio data. In other words, the temporal stop of the writing operation prevents a data overflow in the CD-ROM data storage 204.

The system controller 210 determines whether or not the EFM demodulated data EFM includes audio data with the aid of the sub-code SUB-Q from the audio signal processing section 201, and controls a data selection of the first selector 203 and an operation of the audio interface 205 based on the determined result. More specifically, when the EFM demodulated data EFM includes audio data, the system controller 210 allows the first selector 203 to select the EFM demodulated data processed by means of the audio signal processing section 201, and simultaneously allows the audio interface 205 to carry out the transmission of the audio data. Otherwise, when the EFM demodulated data EFM includes digital data, the system controller 210 allows the first selector 203 to select the EFM demodulated data processed by means of the CD-ROM data processing section 202, and simultaneously allows the audio interface 205 to stop the data transmission. Also, the system controller 210 is responsive to the write request signal WRS from the buffer controller 208 to generate a read/write control signal R/W for controlling the reading and writing operation in the CD-ROM data storage 204. This read/write control signal R/W allows the CD-ROM data storage 204 to perform the reading and writing operations by turns, in both the case where the disc rotates at the normal speed and the case where digital data is included in the EFM demodulated data EFM generated in such a state that the disc rotates at a faster speed than the normal speed. In the latter case, that is, when the disc rotates at a faster speed than the normal speed, the read/write control signal R/W switches the reading and writing operations in the CD-ROM data storage 204 at a faster speed (i.e., twice or four times the normal speed) than the normal speed. Otherwise, in the case where audio data is included in the EFM demodulated data EFM generated in such a state that the disc rotates at a faster speed than the normal speed, the read/write control signal R/W allows the reading operation interval and the writing operation interval in the CD-ROM data storage 204 to be made at a ratio of 1 to 2 or 1 to 4. In this case, the reading operation is performed once whenever the writing operation is carried out twice or four times. Further, the system controller 210 issues a track jump command TJC to the track jump controller whenever the write pause request signal WPRS is applied from the buffer controller 209. Then, the track jump controller 209 is responsive to the track jump command TJC to control the tracking actuator installed in the pickup (not shown), thereby moving the pickup for a predetermined pitch corresponding to a certain number of tracks. Accordingly, audio data recorded on the certain number of tracks is reproduced again.

During reproducing the audio data recorded on the certain number of tracks again, the CD-ROM data storage 204 performs the reading operation only at a frequency corresponding to the sampling frequency of the audio data, thereby producing read-out empty storage areas. When new audio data begins to be reproduce after the audio data recorded on the certain number of tracks was reproduced again, the CD-ROM data storage 204 carries out the writing and reading operations at a ratio of 2 to 1 or 4 to 1 under control of the buffer controller 208. Since the transfer rate of high-speed audio data is reduced into a transfer rate corresponding to the sampling frequency thereof by means of the CD-ROM data storage 204 operating as described above, it becomes possible to make a faithful reproduction of the high-speed audio data.

Figure 3:
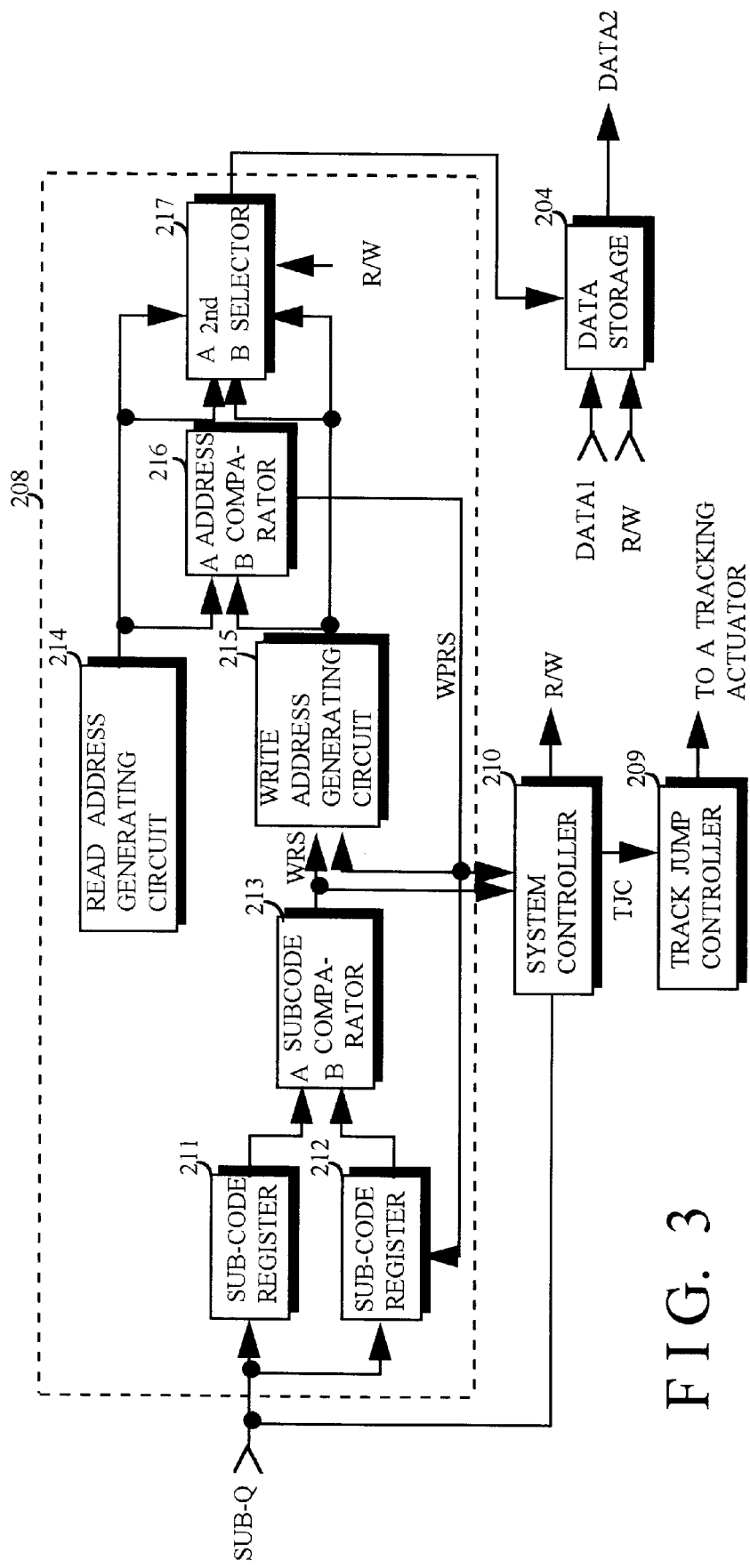
FIG. 3 is a detailed block diagram of the buffer controller shown in FIG. 2.

FIG. 3 is a detailed block diagram of the buffer controller 208 shown in FIG. 2. Referring now to FIG. 3, the buffer controller 208 includes a sub-code comparator 213 for comparing sub-codes SUB-Q stored each of first and second sub-code registers 211 and 212, an address comparator 216 for receiving address signals from a read address generating circuit 214 and a write address generating circuit 215, and a second selector 217.

The first sub-code register 211 stores sub-codes SUB-Q sequentially inputted from the audio signal processing section 201 for a certain time. On the other hand, the second sub-code register 212 stores sub-codes SUB-Q sequentially inputted from the audio signal processing section 201 for a certain time or holds any one of the sub-codes SUB-Q in response to the write pause control signal WPRS from the address compartor 216. Accordingly, the second sub-code register 212 stores the same sub-codes as the sub-codes SUB-Q stored in the first sub-code register 211 in a time interval when the write pause control signal WPRS is disabled; while it stores sub-codes different from the sub-codes SUB-Q stored in the first sub-code register 211 in a time interval when the write pause control signal WPRS is enabled. The sub-code comparator 213 generates a write request signal WRS for requesting the writing of data when sub-codes SUB-Q from the first sub-code register 211 are identical to those from the second sub-code register 212. This write request signal WRS is enabled when the first CD-ROM data DATA1 following the first CD-ROM data DATA1 (i.e., audio data) stored in the CD-ROM data storage 204 finally is reproduced from the disc after the data storing operation in the CD-ROM data storage 204 was stopped.

The read address generating circuit 214 generates a read address signal for assigning storage areas of the CD-ROM data storage 204 to be read out, and applies the read address signal to a first input port A of the address comparator 216 and a first input port A of the second selector 217. This read address signal increments its value by one and have cyclic logical values such that it can cyclically assign the storage areas of the CD-ROM data storage 204 one by one. Also, the read address signal varies at the normal speed in both the case where digital data recorded on the disc is reproduced at the normal speed and the case where audio data recorded on the disc is reproduced at the normal speed or at a twice or four times faster speed than the normal speed; when it varies at a twice or four times faster speed than the normal speed in the case where digital data is reproduced at a twice or four times faster speed than the normal speed. The write address generating circuit 215 generates a write address signal for cyclically assigning storage areas of the CD-ROM data storage 204 to be written during an enabled interval of the write request signal WRS from the sub-code compartor 213. Also, the write address generating circuit 215 holds a certain logical value of write address signal during an enabled interval of the write pause request signal WPRS from the address comparator 216. In other words, the write address signal generated at the write address generating circuit 215 varies sequentially and cyclically during an enabled interval of the write request signal WRS while it does not vary during an enabled interval of the write pause request signal WPRS. The write address signal varying during an enabled interval of the write request signal WRS as described above changes at the normal rate (i.e., the sampling frequency of audio data) when digital data and audio data recorded on the disc are reproduced at the normal speed; while it changes at a twice or four times faster rate than normal rate when digital data and audio data recorded on the disc are reproduced at a twice or four times faster speed than the normal speed. Further, the write address signal changes at the same rate as the read address signal when digital data recorded on the disc is reproduced at a twice or four times faster speed than the normal speed; while it changes at a twice or four times faster rate than the read address signal when audio data recorded on the disc is reproduced at a twice or four times faster speed than the normal speed. As a result, the write address signal varies at a twice or four times faster rate than the read address only when audio data is reproduced at a twice or four times faster speed than the normal speed from the disc. Such a write address signal is applied to a second input port B of the address comparator 216 and a second input port B of the second selector 217.

The address comparator 216 compares the read address signal with the write address signal to detects whether or not the CD-ROM data storage 204 is full of data. When the CD-ROM data storage 204 is full of data, that is, when the read address signal matches the write address signal, the address comparator 216 generates a write pause request signal WPRS to thereby prevent the overflow of data in the CD-ROM data storage 204. The write pause request signal WPRS generated at the address comparator 216 is periodically enabled when the data writing speed in the CD-ROM data storage 204 has a twice or four times speed than the data reading speed therein, that is, when audio data is reproduced at a twice or four times speed than the normal speed. Further, the write pause request signal WPRS is alternately enabled with respect to the write request signal WRS generated at the sub-code comparator 213, and is enabled during a time interval when a certain number of tracks are rotated.

The second selector 217 is responsive to the read/write control signal R/W from the system controller 210 to selectively transmit the read address signal and the write address signal to the CD-ROM data storage 204. More specifically, the second selector 217 selects the read address signal and the write address signal alternately in both the case where digital data recorded on the disc is reproduced and the case where audio data is reproduced at the normal speed. Otherwise, when audio data recorded on the disc is reproduced, the second selector 217 selects the write address signal twice or four times successively, or the read address signal only whenever the read address signal is selected once, based on whether or not the CD-ROM data storage 204 is full of data. The selection of the read and writer address signals at a ratio of 1 to 2 or 1 to 4 is performed when the CD-ROM data storage 204 is not full of data, that is, when storage areas stored by the previously read-out data exist in the storage area of the CD-ROM data storage 204; while the selection of the read address signal only is performed during a time interval when a certain number of tracks are rotated in the case where the CD-ROM data storage 204 is full of data, that is, in the case where the unread data is stored in all the storage areas of the CD-ROM data storage 204. Accordingly, when audio data recorded on the disc is reproduced at a twice or four times faster speed than the normal speed, the read address signal emerges once every sampling period of the audio signal in the second selector 217, whereas the write address signal emerges four times every sampling period of the audio signal without emerging during a time interval when the certain number of tracks are rotated. In this case, the write address signal becomes to have sequential and cyclical logical values, even though it is restarted after being broken during the time interval when the certain number of tracks are rotated.

The CD-ROM data storage 204 responsive to the read/write control signal R/W from the system controller 210 also performs the reading and writing operations alternately in both the case where digital data recorded on the disc is reproduced at the normal speed, or a twice or four times faster speed than the normal speed and the case where audio data recorded on the disc is reproduced at the normal speed; whereas it performs intermittently the reading operation only in the course of performing the read operation once and the writing operation twice or four times. In this case, The reading and writing operations at a ratio of 1 to 2 or 1 to 4 are performed when the CD-ROM data storage 204 is not full of data, that is, when storage areas stored by the previously read-out data exist in the storage area of the CD-ROM data storage 204; while the reading operation only is performed during a time interval when a certain number of tracks are rotated in the case where the CD-ROM data storage 204 is full of data, that is, in the case where the unread data is stored in all the storage areas of the CD-ROM data storage 204.

The system controller 210 generates a read/write control signal R/W for assigning the writing and reading operations by turns when digital data recorded on the disc is reproduced or when audio data recorded on the disc is reproduced at the normal speed; while it generates a read/write control signal R/W for assigning the reading operation once and the writing operation four times every sampling period of the audio signal and a read/write control signal R/W for assigning the reading operation every sampling period of the audio signal, alternately. In order to generate such read/write control signals R/W, the system controller 210 detects whether or not audio data is reproduced, a reproducing speed of disc and so on with the aid of the sub-codes SUB-Q from the sub-code comparator 213, and determines whether or not the first CD-ROM data can be written into the CD-ROM data storage 204 with the aid of the write request signal WRS from the sub-code comparator 213. Also, the system controller 210 determines whether or not the reading operation only must be assigned by the write pause request signal WPRS from the address comparator 216. Further, the system controller 210 issues a track jump command TJC to the track jump controller 209 when the write pause request signal WPRS is enabled, thereby moving the pickup for a predetermined pitch corresponding to a certain number of tracks. Then, the track jump controller 209 is responsive to the track jump command TJC to drive the tracking actuator installed in the pickup, thereby reading the previously reproduced audio data recorded on the certain number of tracks again. When the pickup track-jumped in this way re-reads the audio data recorded on the certain number of tracks and thereafter begins to read new audio data, the write request signal WRS generated at the sub-code comparator 213 is enabled and simultaneously the write pause request signal WPRS is disabled, thereby writing the first CD-ROM data DATA1 including audio data into the CD-ROM data storage 204 again.

As described above, a CD-ROM player according to the present invention can make a faithful reproduction of high-speed audio data without a reduction in the playing speed of disc by the unoverlapped process path of audio signal by utilizing the CD-ROM data storage as the output buffer of the audio signal processing section. Accordingly, the CD-ROM player according to the present invention not only allows the process path of audio signal to be shortened, but also it allows the response speed to be fast.

Further, in the CD-ROM player according to the present invention, the CD-ROM data storage is used as the output buffer of the audio signal processing section as well as the output buffer of the CD-ROM data processing section, thereby overlapping the process path of audio data with the process path of digital data. As a result, the CD-ROM player according to the present invention is capable of simplifying its circuit configuration as well as making an integration thereof with easy.

Although the present invention has been explained by the embodiment shown in the drawings described above, it should be understood to the ordinary skilled person in the art that the invention is not limited to the embodiment, but rather that various changes or modifications thereof are possible without departing from the spirit of the invention. Accordingly, the scope of the invention shall be determined only by the appended claims and their equivalents.

What is claimed is:

1. A method of reproducing audio data from a disc, comprising the steps of:

reading data at a high speed from the disc;

performing an audio data error correction for said data to decode the corrected data primarily;

determining whether or not said primarily decoded data is audio data;

if said primarily decoded data is audio data, selecting said primarily decoded data to temporarily store it into a buffer;

reading said temporarily stored audio data at the normal speed and transmitting it;

converting said transmitted audio data into an analog signal to make a voice output of it; and if an overflow occurs in said step of temporarily storing said audio data, then controlling a track jump to read in the previously read data again, said method further comprising the buffer control step of stopping said track jump control and said temporal store of input data upon occurrence of said overflow, and restarting said temporal store of input data when said data track-jumped and inputted again arrives at said temporarily stopped point.

2. The method as claimed in claim 1, further comprising the steps of:

if said data read at the high speed is not audio data, then performing an audio data error correction for said primarily decoded data to decode the corrected data secondarily;

selecting said secondarily decoded digital data to store it temporarily; and transmitting said temporarily stored digital data to a host computer at a high speed.

3. The method as claimed in claim 2, wherein said step of transmitting said digital data includes making a mute of said voice output.

4. The method as claimed in claim 1, wherein the determination as to whether or not said primarily decoded data is audio data is made by sub-codes.

5. The method as claimed in claim 1, wherein said buffer control step includes the step of:

temporarily storing sub-codes from said input data;

generating a write address at a high speed to store said input data;

generating a read address at the normal speed to read out said stored address;

storing said generated read or write address into the buffer; and comparing said read address with said write address to determine the presence of said overflow, and if said overflow exists, then temporarily storing sub-codes of final input data and stopping said write address generating operation until sub-codes of new input data become identical to said temporarily stored sub-codes.

6. The method as claimed in claim 1, wherein said track jump control step includes track-jumping to make a backward movement by a predetermined track.

7. An apparatus for reproducing audio data from a disc, comprising:

means for reading in data at a high speed from the disc;

primary decoding means for performing an audio data error correction for said data to decode the corrected data primarily;

buffer means for selecting and temporarily storing said primarily decoded data when said primarily decode data is audio data;

audio interface means for reading said temporarily stored audio data from said buffer means at the normal speed and transmitting it;

means for converting said transmitted audio data into an analog signal to make a voice output of it;

track jump control means for performing a track jump if an overflow occurs in said buffer means;

buffer control means for controlling writing and reading operations in said buffer means and simultaneously inhibiting the writing operation in said buffer means upon occurrence of said overflow and for informing it; and system control means for controlling to select said primarily decoded data as an input of said buffer means when said input data is audio data and for controlling said track jump control means in accordance with an output of said buffer control means.

8. The apparatus as claimed in claim 7, wherein said buffer control means includes means for temporarily storing sub-codes from said input data;

means for generating a write address at a high speed to store said input data;

means for generating a read address at the normal speed to read out said stored address;

address selecting means for selecting said generated read or write address to assign the reading or writing operation in said buffer means;

address comparing means for comparing said read address with said write address to determine the presence of said overflow, and if said overflow exists, then temporarily storing sub-codes of final input data and stopping the operation of said write address generating means and simultaneously informing said control means of it; and sub-code comparing means for comparing said temporarily stored sub-codes with sub-codes of new input data and informing said control means of the compared result.

9. The apparatus as claimed in claim 7, further comprising:

secondary decoding means for performing an audio data error correction for said primarily decoded data to decode the corrected data secondarily if said data read at the high speed is not audio data; and host interface means for transmitting said temporarily stored digital data to a host computer at a high speed.

10. The apparatus as claimed in claim 2, wherein said control means controls to select said secondarily decoded data and temporarily store into said buffer means and simultaneously provides a mute process of said audio interface means.

* * * * *